United States Patent [19]

Thompson et al.

[11] Patent Number: 4,548,920

[45] Date of Patent: Oct. 22, 1985

[54] HYDRODENITRIFICATION CATALYST

[75] Inventors: Mark S. Thompson; Charles T. Adams, both of Houston, Tex.

[73] Assignee: Shell Oil Company, Houston, Tex.

[21] Appl. No.: 593,060

[22] Filed: Mar. 26, 1984

[51] Int. Cl.$^4$ .............. B01J 27/02; B01J 29/06; B01J 31/02; B01J 27/20

[52] U.S. Cl. .................... 502/219; 502/74; 502/87; 502/150; 502/174; 502/220; 208/254 H

[58] Field of Search ............. 502/74, 87, 150, 174, 502/219, 220

[56] References Cited

U.S. PATENT DOCUMENTS

| | | | |
|---|---|---|---|
| 2,430,632 | 11/1947 | Fetterly | 502/219 X |
| 2,813,911 | 11/1957 | Mason et al. | 502/219 X |
| 3,083,246 | 3/1963 | Holzman et al. | 502/174 X |
| 3,417,088 | 12/1968 | Kmiecik | 502/174 X |
| 3,463,827 | 8/1969 | Banks | 502/174 X |
| 3,480,479 | 11/1969 | Nestor | 502/220 X |
| 3,654,317 | 4/1972 | Harrod et al. | 502/174 X |
| 3,872,028 | 3/1975 | Rijnten et al. | 502/220 X |
| 4,266,070 | 5/1981 | Moy | 502/174 X |
| 4,368,141 | 1/1983 | Kukes | 502/219 |
| 4,447,555 | 5/1984 | Parrott et al. | 502/74 |
| 4,447,556 | 5/1984 | O'Hara et al. | 502/74 |

FOREIGN PATENT DOCUMENTS 2056478 3/1981 United Kingdom ............ 502/219

*Primary Examiner*—D. E. Gantz
*Assistant Examiner*—William G Wright

[57] ABSTRACT

A method for preparing hydrotreating catalysts containing Group VIII and/or Group VIB catalytically active metals on a support, and particularly those containing nickel and molybdenum, are improved in hydrodenitrification (HDN) activity by incorporating zero-valence molybdenum and/or tungsten carbonyls into the catalyst support by mixing a liquid mixture containing metal carbonyl(s); a catalytic amount of dienes, trienes or monoaromatics; and free sulfur; with a dried catalyst support and heating the liquid-solid mixture until metal carbonyl conversion to metal disulfide is substantially complete. The catalyst is then dried followed by calcining in inert gas, before use in a hydrotreating process.

28 Claims, No Drawings

HYDRODENITRIFICATION CATALYST

BACKGROUND OF THE INVENTION

This invention relates to a method for preparing an improved hydrotreating catalyst containing molybdenum and/or tungsten, particularly with respect to hydrodenitrification (HDN) activity.

Considerable research has been undertaken to develop and commercialize new, cost effective hydrotreating catalysts for large volume first stage hydrocracking and catalytic cracking feed hydrotreater applications. The inclusion of significant amounts of 1000° F.+ residual components, including cracked stocks, in the feed to these processes has created severe activity and stability problems for the catalysts currently used commercially in these applications. The growing demand for new catalysts for up-grading such poor quality feedstocks has led to the discovery of an improved catalyst by oxidizing zero-valence molybdenum and/or tungsten with elemental sulfur ($S_8$) to yield a metal sulfide directly instead of by first oxidizing the metals (e.g., by calcining in air) and then sulfiding them.

It is known to combine molybdenum carbonyls with alumina to prepare a catalyst for the metathesis of olefins (J. Mol. Catalysis, 1 (1975/76)77–84. We have discovered that molybdenum and/or tungsten carbonyls can be directly oxidized to the corresponding sulfide with free sulfur to achieve hydrotreating catalysts with greatly enhanced hydrodenitrification activity.

SUMMARY OF THE INVENTION

A method is disclosed for preparing a supported hydrotreating catalyst having improved hydrodenitrification activity which comprises mixing an amount of molybdenum and/or tungsten carbonyl compound(s) sufficient to provide from about 10 to 20%wt. metal on a suitable support with at least a catalytic amount of an organic liquid selected from the group consisting of dienes, trienes or monoaromatics, optionally in the presence of an organic solvent; adding sufficient elemental sulfur to said liquid mixture to convert said carbonyl compound(s) to the corresponding disulfide; a desired quantity of dried solid catalyst support to said mixture; mixing a desired quantity of dried solid catalyst support with said liquid mixture; heating said liquid-solid mixture until metal carbonyl conversion to disulfide is substantially complete; separating supported catalyst from any excess liquid mixture; drying said catalyst and calcining said catalyst under inert gas at elevated temperature.

DETAILED DESCRIPTION OF THE INVENTION

This invention is applicable to supported hydrotreating catalysts which contain Group VIII and Group VIB metals of the Periodic Table incorporated into a support. Typically such catalysts will contain from about 1 to 5%wt. although from about 0.1 to 1%wt. platinum or palladium may also be used, nickel and/or cobalt as Group VIII metals, and from about 10 to 20%wt. molybdenum or tungsten as the Group VIB metals.

Any of the usual catalyst supports are thought to be suitable for the invention. Suitable supports for the catalysts of the invention include refractory oxides, such as alumina, silica and mixtures thereof. Crystalline synthetic zeolites such as aluminosilicates, iron silicates, gallium silicates and mixtures thereof may also be used as supports, preferably in combination with refractory oxide supports. A particularly preferred support is gamma-alumina which contains less than 1%w silica.

Metal carbonyls are zero-valence as far as the metals are concerned. Known metal carbonyls include $M(CO)_4$ to $M(CO)_6$, and all of these carbonyls should be equally suitable for the invention.

A substantial increase in the hydrodenitrification (HDN) activity, relative to commercial catalysts, is required to commercialize a new hydrotreating catalyst. In an effort to develop such an improved catalyst, many experimental catalysts were prepared and tested for HDN activity. A standard 72 hour HDN activity test was used to evaluate these catalysts. In this test the HDN and HDS (hydrodesulfurization) activities of a cracked cat heavy gas oil were evaluated at 344° C. and 850 psi $H_2$ pressure. Activities compared were based on observed rate constants for HDN and based on plug flow kinetics for HDS.

One of our research goals was to systematically vary the degree of interaction between metals and support, the interaction between metals, and the dispersion of the metals in an effort to determine the chemical and morphological requirements of a high activity catalyst. Described herein is a catalyst preparation method wherein surface-bound $MoS_2$ is prepared by oxidizing zero-valence Mo or W with elemental sulfur rather than reducing the metal oxide with $H_2/H_2S$ as is usually done. Catalyst prepared in this way displays much greater hydrodenitrification activity (~35%) than the standard catalyst (Table 1), with the most reasonable explanation rooted in changes in the dispersion and/or metal-support interaction.

A typical catalyst is prepared by the aqueous dry impregnation of a support with phosphoric acid and [Ni(H$_2$O)$_4$OAc]OAc, (where OAc =acetate) followed by drying at 120° C. The impregnated support is then reacted with $Mo(CO)_6$, cycloheptatriene (CHT) and $S_8$ in refluxing THF solvent under $N_2$. This catalyst has been prepared and tested several times in a standardized activity test (Test Conditions: CCHGO Feed, 344° C., 850 psig, LHSV=1, 4:1H$_2$/oil).

In exploring the reactions of various organometallic complexes with silica and alumina we observed the clean decomposition of Mo(cycloheptatriene)(CO)$_3$ at 25° C. to give the very reactive surface bound Mo(CO)$_3$ fragment and free CHT. Conceptually, the Mo(CO)$_x$ moiety is activated by replacing the tightly bound CO ligands with the loosely bound olefin. This dramatically increases the reactivity of the molybdenum toward the carrier. The metal-CO stoichiometry has not been determined by elemental analysis but is consistent with the number of bands in the 2000 cm$^{-1}$ to 1900 cm$^{-1}$ region (carbonyl stretch) of the infra-red part of the spectrum. This reaction gives high surface coverage of Mo (~6% Mo by weight; nearly monolayer). This is in contrast to the reported decomposition of $Mo(CO)_6$ on alumina to Mo(CO)$_3$ which results in much lower coverage (<1% Mo) and requires high temperature (Burwell, R. L., Brenner, A., *J. Mole., Cat.*, 1, 77, (1975); and Howe, R. F.; *Inorg. Chem.*, 15, 486, (1976). The difference between these two reactions is probably caused by the greater lability of the alkene (CHT) as a ligand relative to CO. The Mo can then be oxidized by elemental sulfur to give $MoS_2$.

Preparatively, one mole CHT is generally used for each mole of Mo or W, however, substoichiometric amounts are equally effective. Additionally, butadienes and monoaromatics can be substituted for CHT.

In addition to alumina supports, we have tried the method of the invention on silica based catalysts. Interest in silica supports derives from the premise that silica based catalysts should be less prone to coke formation than alumina based catalysts due to the low acidity of silica. There are great problems associated with preparing $SiO_2$ supported hydrotreating catalysts by aqueous, pore filling techniques, however. The precursor metal oxides ($MoO_3$, NiO, CoO) interact very weakly with the support, thus having very poor dispersion. This results in catalysts of very poor activity. Thus, one approach to the preparation of high activity silica based catalysts is to improve the dispersion of the metals. With this as our approach, we have prepared some $SiO_2$ supported catalysts of high activity. One of the principal reasons for the superior performance of alumina supported catalysts prepared by the method of the invention is thought to be the high metal dispersion resulting from the strong interaction of the molybdenum-carbonyl fragment with the surface oxygens of the support. The preparation method appears in Example 2, herein. It appears that what has been achieved is a high coverage of silica by Ni(II) and $MoS_2$, presumably with good intermingling of the two metals. This points the way to the preparation of high activity $SiO_2$ supported catalysts from low cost materials. It appears that the critical feature for the metal sulfide precursor to possess is capacity for strong interaction with the support surface (giving high dispersion) and ease of sulfiding.

Suitable hydroconversion conditions for the processes using improved catalysts according to the present invention are as follows: a temperature of 350°–420° C.; a total pressure of 75–200 bar; a partial hydrogen pressure of 60–200 bar; a space velocity of 0.4–1.5 kg oil/l catalyst/hour; and a hydrogen feed rate of 250–2500 Nl/kg oil feed. The hydrodenitrification of heavy oil feeds according to the present process is preferably carried out under the following conditions: a temperature of 360°–410°; a total pressure of 100–150 bar; a partial hydrogen pressure of 80–150 bar; a space velocity of 0.4–1.0 kg oil/l catalyst/hour; and a hydrogen feed rate of 500–1500 Nl/kg oil feed.

The hydrogen applied can be pure hydrogen or a hydrogen-containing gas, preferably one comprising more than 70% of hydrogen. The hydrogen-containing gas may also contain up to about 10% of hydrogen sulfide.

It is preferred that the hydrocarbon oil feed stream contain less than 3 ppmw, and most preferably less than 1 ppmw of vanadium and nickel combined. In some cases it is necessary to subject the hydrocarbon oil to a demetallization pre-treatment in order to reach these levels.

The preferred catalysts used for the demetallization pretreatment comprise 1–5%w of nickel and 5–15%w of molybdenum, both percentages based on total catalyst. The preferred molybdenum:nickel weight ratio lies between 3:1 and 6:1. These metals may be incorporated into the catalyst by any method known in the art, for example by impregnation of alumina in one or more stages with an aqueous solution containing one or more salts of the metals concerned. Suitable conditions for carrying out the demetallization pre-treatment are as follows: a temperature of 370°–420° C.; a total pressure of 65–220 bar; a partial hydrogen pressure of 60–200 bar; a space velocity of 0.2–2 kg oil/l catalyst/hour; and a hydrogen feed rate of 250–2500 Nl/kg oil.

The gas streams separated from both the pre-treated and the converted hydrocarbon oils, as well as from the residual fraction and the product obtained, can all be partially or completely recycled.

The invention will now be illustrated by the following examples:

EXAMPLE 1

This example describes a hydrotreating catalyst preparation method wherein surface-bound $MoS_2$ is formed by oxidizing zero-valence molybdenum with elemental sulfur rather than reducing the metal oxide with a $H_2/H_2S$ gas mixture, as is usually done.

Two catalyst samples A and B were prepared by aqueous dry impregnation of 200 g of 1/16-inch gamma alumina extrudate support with 150 ml of an aqueous solution containing 33.4 g $Ni(H_2O)_4(OAc)_2$ and 32.4 g 85% $H_3PO_4$, followed by drying the composite for 12 hours at 120° C. The nickel acetate was added in sufficient quantity to provide about 2.5–3.0%wt Ni. The impregnated $Al_2O_3$ support was then contacted with a mixture of $Mo(CO)_6$, cycloheptatriene, $S_8$ and tetrahydrofuran (THF) for 72 hours under refluxing conditions (67° C.). The catalysts were then washed with THF, air dried for 12 hours at 25° C. and calcined for 1 hours at 300° C. under $N_2$. Catalysts A and B contained 10.4%wt and 11.8%wt Mo, respectively.

These two catalysts were compared to a standard commercial hydrotreating catalyst (available from Shell Chemical Company) using a standard CCHGO feed under first stage hydrocracking conditions. (Feed properties: 88.99%C; 9.68% $H_2$; 1.28% S; 482 ppm N). For these tests, 10.4 cc of 16/45 mesh catalyst were placed in a microreactor and used to contact the feed at 344° C., 850 psig, and $H_2$/oil ratio=4/1. Results of the tests are shown in Table 1.

The relative activity of the standard catalyst was taken as 1.00, by definition. Catalysts A and B showed an average increase in HDN activity of about 35% over the standard commercial catalyst.

TABLE 1

| | CCHGO ACTIVITY TEST RESULTS | | | | | |
|---|---|---|---|---|---|---|
| | Relative Activity | | | Composition | | |
| Catalyst | Hydrogenation[a] | Hydrodenitrification[b] | Hydrodesulfurization[c] | % Mo | % Ni | Surface Area |
| Commercial | 1.00 | 1.00 | 1.00 | 13.2 | 2.7 | 160 m$^2$/g |
| A | 1.00 | 1.32 | .98 | 10.4 | 2.5 | 177 m$^2$/g |
| B | 1.05 | 1.38 | 1.04 | 11.8 | 2.5 | 181 m$^2$/g |

[a] $H_2$ consumption/$H_2$ consumption for commercial catalyst.
[b] Hydrodenitrification rate constant/hydrodenitrification rate constant of commercial catalyst.
[c] Hydrodesulfurization rate constant/hydrodesulfurization rate constant of commercial catalyst.

EXAMPLE 2

This example describes a hydrotreating catalyst preparation method using a silica support.

To catalysts, C and D, were prepared starting with Grade 57 silica support, manufactured by Davison, a division of W. R. Grace Co. Catalyst C, which is included for comparison since it was not prepared according to the invention, was prepared by a conventional aqueous, pore-filling impregnation, whereby sufficient nickel carbonate and ammonium dimolybdate were present in an aqueous solution of ammonium hydroxide, to impart the desired composition to the finished catalyst. The impregnated catalyst was then dried at 120° C. for 4 hours and calcined in air at 500° C. for 2 hours. This catalyst was sulfided in a conventional manner, by contact at elevated temperature (400° C.) with hydrogen containing 5%v $H_2S$, for 7 hours.

Catalyst D was prepared according to the invention by dissolving 17.5 [Ni(H$_2$O)$_4$OAc]OAc in 70 ml concentrated NH$_4$OH and using the solution to impregnate 75 g Davison grade 57 silica (25/45 mesh, calcined at 500° C.). This composite was then dried for 18 hours at 120° C. under nitrogen vacuum. The dried material was heated at reflux for 24 hours in tetrahydrofuran (THF) with 100 g Mo(CO)$_6$, 32 g S$_8$, and 75 ml cyclohepatriene in 250 ml THF. The catalyst was then cooled, collected on 60 mesh screen, air dried at 25° C. for 4 hours, and calcined at 300° C. under flowing nitrogen for 18 hours.

Catalysts C and D, were then tested in the standard CCHGO test, as set out in Example 1 above. Results of the tests are given in Table 2. As can be seen, the HDN activity of Catalyst D was increased 8 fold over the conventionally prepared silica based Catalyst C.

TABLE 2

| Catalyst | Relative Activity | | | Composition, % w | |
| --- | --- | --- | --- | --- | --- |
| | Hydrogenation | Hydrodenitrification | Hydrodesulfurization | Mo | Ni |
| C | .76 | .17 | .20 | 15 | 3.0 |
| D | 1.0 | 1.35 | 1.0 | ~17 | ~3 |

What is claimed is:

1. A method for preparing a supported hydroconversion catalyst having improved hydrodenitrification activity, which comprises: mixing an amount of molybdenum and/or tungsten carbonyl compound(s) sufficient to provide from about 10 to 20%wt. metal on a suitable support with at least a catalytic amount of an organic liquid selected from the group consisting of dienes, trienes or monoaromatics, in the presence of tetrahydrofuran; adding sufficient elemental sulfur to said liquid mixture to convert said carbonyl compound(s) to the corresponding disulfide; mixing a desired quantity of dried solid catalyst support with said liquid mixture; heating said liquid-solid mixture until metal carbonyl conversion to disulfide is substantially complete; separating support catalyst from any excess liquid mixture; drying said catalyst and calcining said catalyst under inert gas at elevated temperatures.

2. The method of claim 1 wherein said catalyst support contains from 1 to 5%wt. nickel and/or cobalt before it is mixed with said liquid mixture.

3. The method of claim 2 wherein said support is selected from the group consisting of alumina, silica or mixtures thereof.

4. The method of claim 3 wherein said support also includes a crystalline silicate zeolite.

5. The method of claim 3 wherein said carbonyl compound is a hexacarbonyl.

6. The method of claim 1 wherein molybdenum and/or tungsten carbonyl is impregnated into said support in the presence of cycloheptatriene and under refluxing conditions.

7. The method of claim 6 wherein said catalyst support comprises nickel supported on alumina before it is mixed with said liquid mixture.

8. The method of claim 6 wherein said catalyst support comprises nickel and molybdenum supported on alumina, before it is mixed with said liquid mixture.

9. The method of claim 6 wherein said catalyst support comprises nickel supported on silica.

10. A supported hydroconversion catalyst with improved hydrodenitrification activity which contains catalytically active amounts of Group VIII and Group VIB metals incorporated into a suitable support, and which catalyst has been prepared by the method which comprises: mixing an amount of molybdenum and/or tungsten carbonyl compound(s) sufficient to provide from about 10 to 20%wt. metal on a suitable support with at least a catalytic amount of an organic liquid selected from the group consisting of dienes, trienes or monoaromatics, in the presence of tetrahydrofuran; adding sufficient element sulfur to said liquid mixture to convert said carbonyl compound(s) to the corresponding disulfide; mixing a desired quantity of dried solid catalyst support with said liquid mixture; heating said liquid-solid mixture until metal carbonyl conversion to disulfide is substantially complete; separating supported catalyst from any excess liquid mixture; drying said catalyst and calcining said catalyst under inert gas at elevated temperatures.

11. The catalyst of claim 10 wherein said catalytically active Group VIII metal is nickel and/or cobalt and said Group VIB metal is molybdenum and/or tungsten.

12. The catalyst of claim 11 wherein the support is selected from the group consisting of alumina, silica and mixtures thereof.

13. The catalyst of claim 12, wherein said support also includes a crystalline silicate zeolite.

14. The catalyst of claim 13 wherein molybdenum and/or tungsten carbonyl is impregnated into said support in the presence of cycloheptatriene and under refluxing conditions.

15. A method for preparing a supported hydroconversion catalyst having improved hydrodenitrification activity, which comprises: mixing an amount of molybdenum and/or tungsten carbonyl compound(s) sufficient to provide from about 10 to 20%wt. metal on a suitable support with at least a catalytic amount of an organic liquid selected from the group consisting of dienes, trienes or monoaromatics, in the presence of an organic solvent; adding sufficient elemental sulfur to said liquid mixture to convert said carbonyl compound(s) to the corresponding disulfide; mixing a desired quantity of dried solid catalyst support with said liquid mixture; heating said liquid-solid mixture until metal carbonyl conversion to disulfide is substantially complete; separating supported catalyst from any excess liquid mixture; drying said catalyst and calcining said catalyst under inert gas at elevated temperatures.

16. The method of claim 15 wherein said catalyst support contains from 1 to 5%wt. nickel and/or cobalt before it is mixed with said liquid mixture.

17. The method of claim 16 wherein said support is selected form the group consisting of alumina, silica or mixtures thereof.

18. The method of claim 17 wherein said support also includes a crystalline silicate zeolite.

19. The method of claim 17 wherein said carbonyl compound is a hexacarbonyl.

20. The method of claim 15 wherein molybdenum and/or tungsten carbonyl is impregnated into said support in the presence of cycloheptatriene under refluxing conditions.

21. The method of claim 20 wherein said catalyst support comprises nickel supported on alumina before it is mixed with said liquid mixture.

22. The method of claim 20 wherein said catalyst support comprises nickel and molybdenum supported on alumina, before it is mixed with said liquid mixture.

23. The method of claim 20 wherein said catalyst support comprises nickel supported on silica.

24. A supported hydroconversion catalyst with improved hydrodenitrification activity which contains catalytically active amounts of Group VIII and Group VIB metals incorporated into a suitable support, and which catalyst has been prepared by the method which comprises: mixing an amount of molybdenum and/or tungsten carbonyl compound(s) sufficient to provide from about 10 to 20%wt. metal on a suitable support with at least a catalytic amount of an organic liquid selected from the group consisting of dienes, trienes or monoaromatics, in the presence of an organic solvent; adding sufficient element sulfur to said liquid mixture to convert said carbonyl compound(s) to the corresponding disulfide; mixing a desired quantity of dried solid catalyst support with said liquid mixture; heating said liquid-solid mixture until metal carbonyl conversion to disulfide is substantially complete; separating supported catalyst from any excess liquid mixture; drying said catalyst and calcining said catalyst under inert gas at elevated temperatures.

25. The catalyst of claim 24 wherein said catalytically active Group VIII metal is nickel and/or cobalt and said Group VIB metal is molybdenum and/or tungsten.

26. The catalyst of claim 25 wherein the support is selected from the group consisting of alumina, silica and mixtures thereof.

27. The catalyst of claim 26, wherein said support also includes a crystalline silicate zeolite.

28. The catalyst of claim 27 wherein molybdenum and/or tungsten carbonyl is impregnated into said support in the presence of cycloheptatriene under refluxing conditions.

* * * * *